Figure 6:
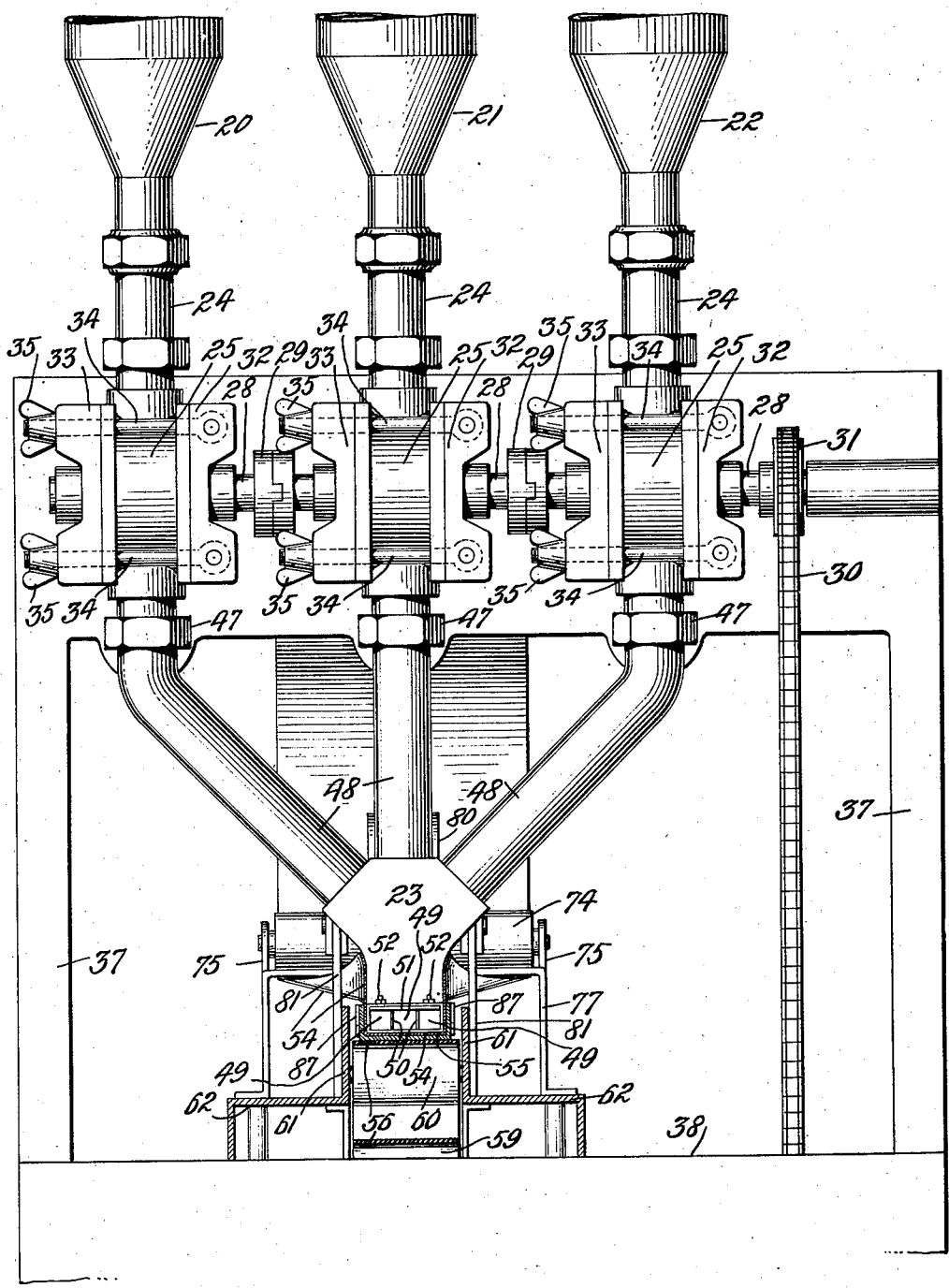

Jan. 1, 1935. L. A. MAPES 1,986,589
METHOD AND APPARATUS FOR FORMING AND WRAPPING
BRICKS OF ICE CREAM AND THE LIKE
Original Filed Oct. 31, 1932 5 Sheets-Sheet 1
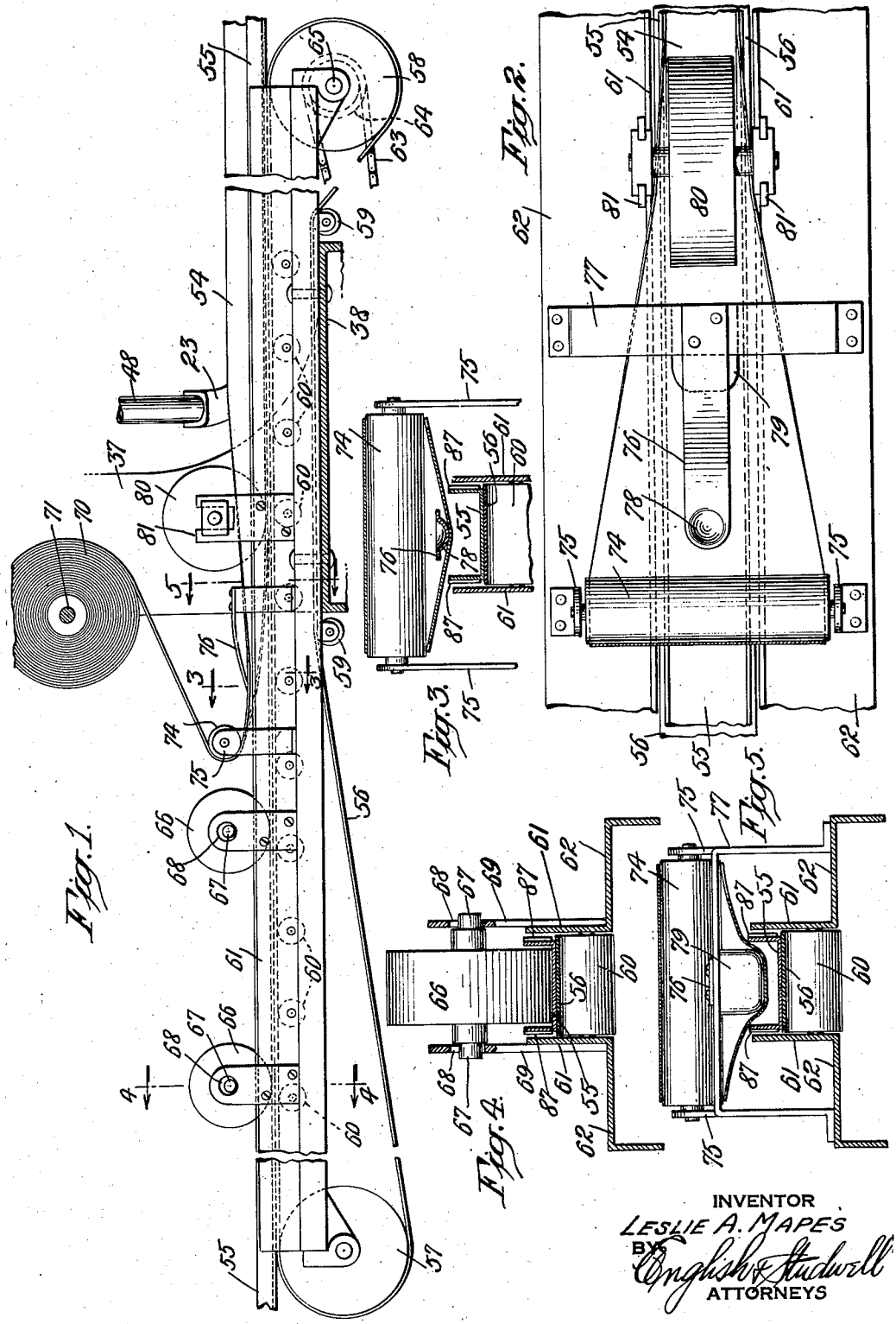
INVENTOR
LESLIE A. MAPES
BY
English & Studwell
ATTORNEYS

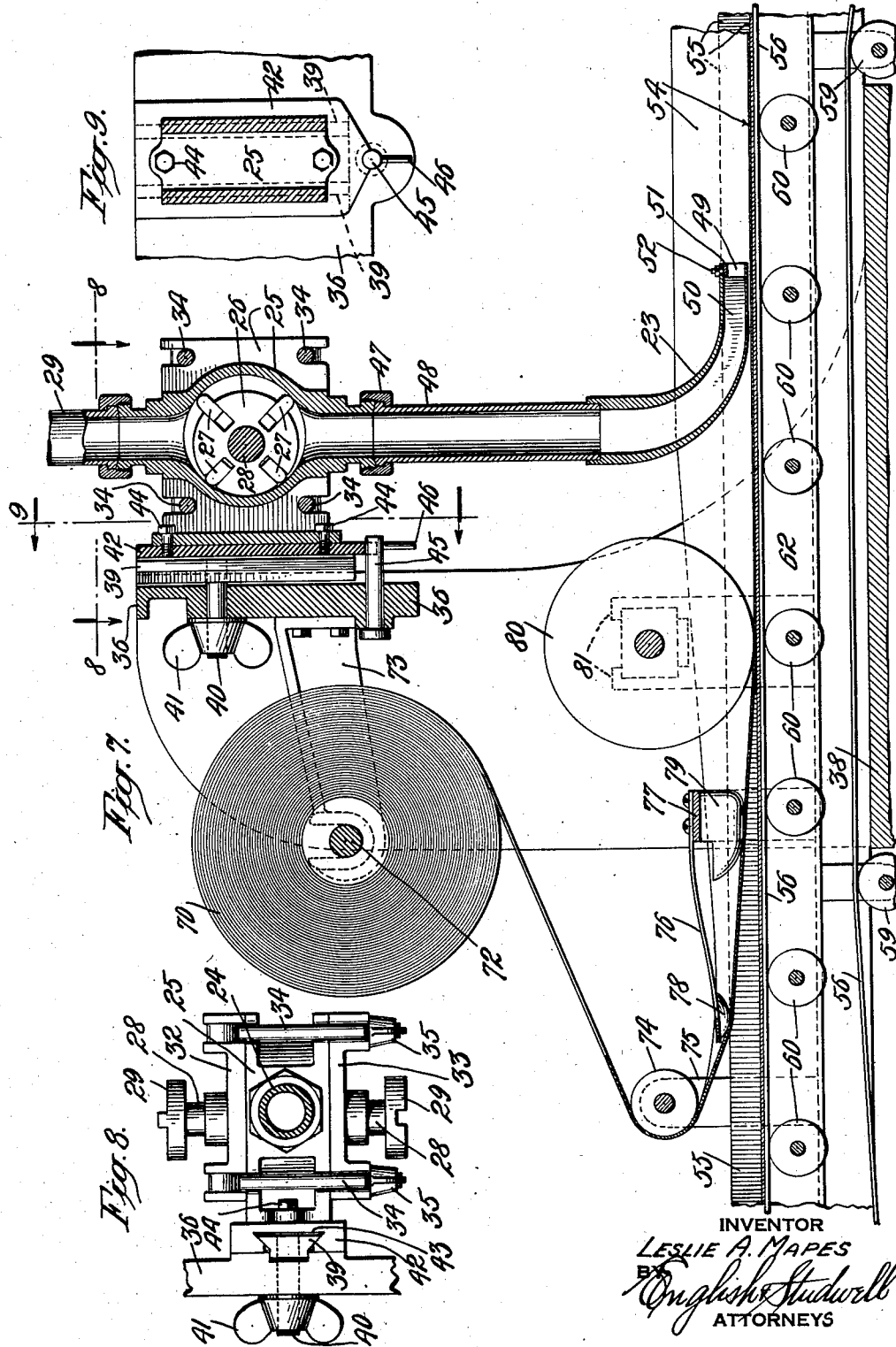

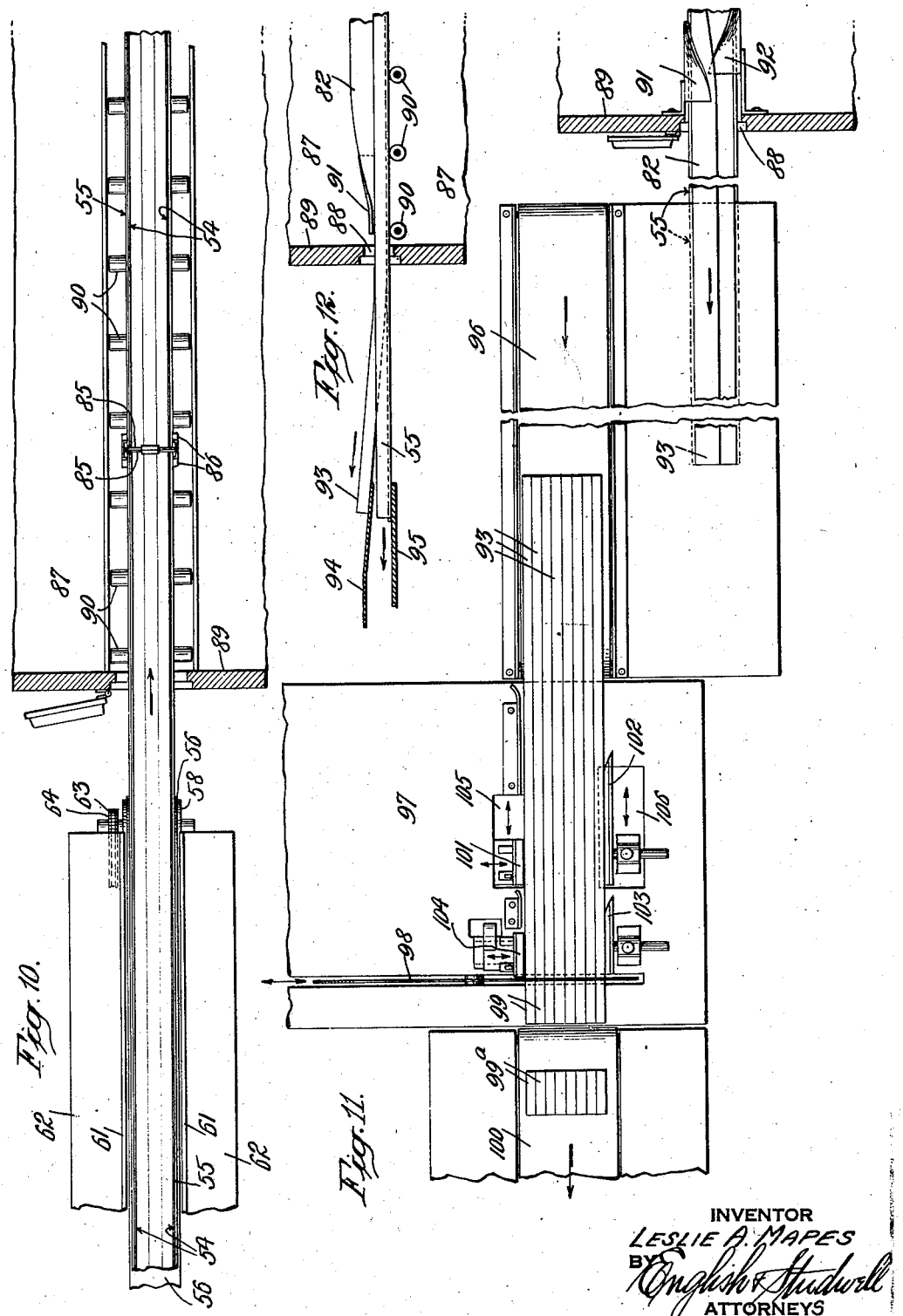

Jan. 1, 1935.  L. A. MAPES  1,986,589
METHOD AND APPARATUS FOR FORMING AND WRAPPING
BRICKS OF ICE CREAM AND THE LIKE
Original Filed Oct. 31, 1932   5 Sheets-Sheet 5
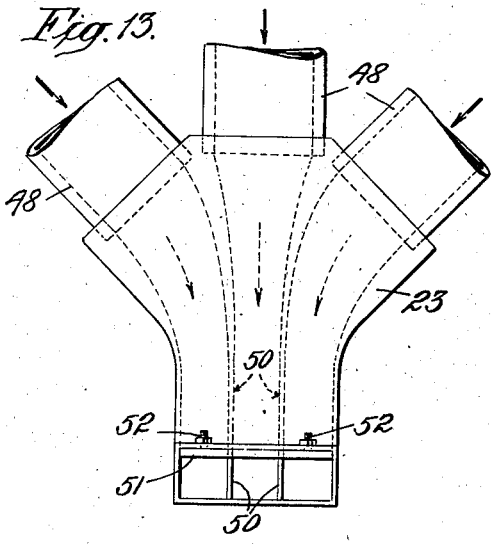
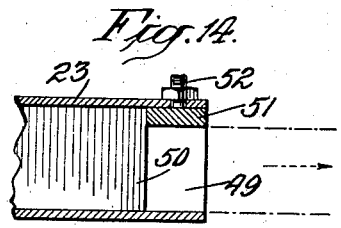
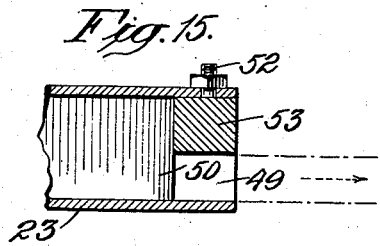
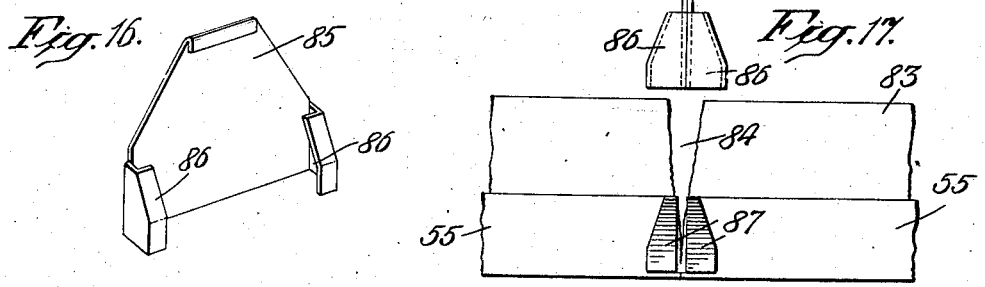
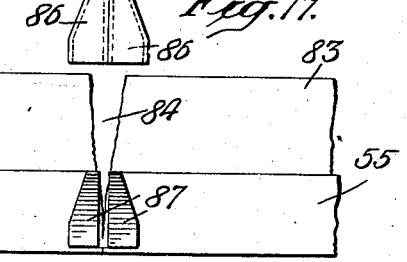
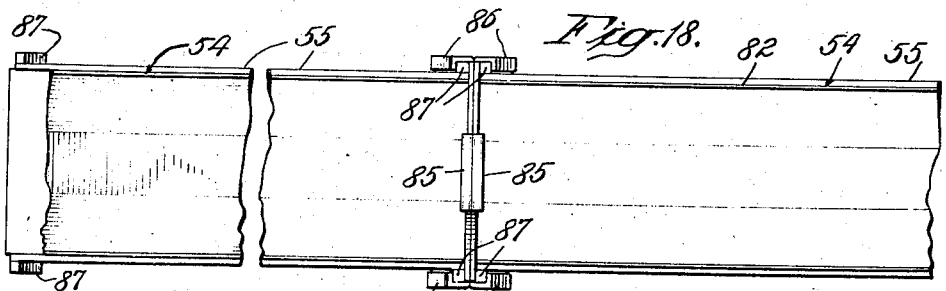
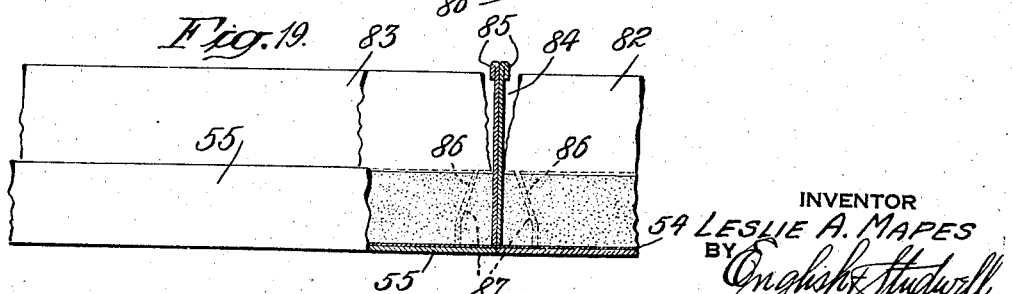
INVENTOR
LESLIE A. MAPES
BY
ATTORNEYS Patented Jan. 1, 1935

1,986,589

UNITED STATES PATENT OFFICE 1,986,589

METHOD AND APPARATUS FOR FORMING AND WRAPPING BRICKS OF ICE CREAM AND THE LIKE

Leslie A. Mapes, Palisade, N. J., assignor to The Borden Company, New York, N. Y., a corporation of New Jersey Application October 31, 1932, Serial No. 640,372
Renewed November 27, 1934

16 Claims. (Cl. 62—114)

The invention relates to an improved method and apparatus for forming and wrapping bricks or slices of ice cream and other plasticizable materials. The invention has been developed in connection with the production of wrapped pieces or slices of ice cream, whether single or multi-flavored, but it will be understood that the invention is not to be restricted to the production of ice cream, since it is equally well adapted to the forming and wrapping of measured pieces of other similarly plasticizable materials, such as candy, soap, cheese and the like.

The general object of the invention is to provide a more efficient and more economical method and apparatus than has heretofore been proposed for producing suitable plastic materials in a continuous strip of desired cross-sectional shape and dimensions, wrapping the strip as it is formed, and then, with or without further treatment, cutting the strip into the requisite lengths for use or consumption. To this end one feature of the invention resides in extruding from a suitably-shaped nozzle the plastic material in a continuous, substantially horizontal stream or ribbon into a channel- or U-shaped wrapper traveling at predetermined speed in the same direction as the ribbon of plastic material, whereby the cross section of the material, both as to shape and dimensions may be accurately adjusted and maintained. If the plastic material is self-hardening at usual room temperatures, it may at any period after insertion in the wrapper (and the completion of the folding of the wrapper) be severed into the requisite lengths. If the material operated on is ice cream, the continuous ribbon of plastic cream is divided into lengths for convenient handling, usually about twelve feet, and placed in a hardening chamber, after which the lengths of hardened cream are cut transversely to provide pieces or slices of a size appropriate for serving and consumption.

To hold the plastic material in proper cross-sectional form and size the continuous channel or U-shaped wrapper before it receives the plastic material is delivered into a trough or tray composed of metal or other suitable substance and of the width of the piece of material to be formed and wrapped. The trough or tray, to facilitate handling, is made in sections, which are placed on a conveyor traveling in the direction of the extruding plastic material. The rate of travel of the conveyor, the height of the nozzle opening and the rate of extrusion of the plastic material are correlated to produce a ribbon the width of the wrapper lined trough and of the desired height or thickness.

More specifically, the invention contemplates the filling of paper-lined elongated open-ended trays while the trays are in motion on a conveyor, by a nozzle having an outlet opening headed in the direction of movement of the trays, the nozzle being connected to several pipes through which different flavors of ice cream in plastic or semi-liquid state are fed. The trays when filled have their opposite ends closed by plates or partitions and are then placed in a freezing or refrigerating chamber where the ice cream is frozen. Upon leaving the refrigerating chamber the paper lining in the tray is wrapped about the hardened bar or slab of cream and the then paper-wrapped slab is stripped from the tray. The bar or slab in company with a number of other like slabs, is placed on edge on a conveyor and transported to a cutting device which severs the slabs into blocks or bricks which are packed in cartons.

In the accompanying drawings is shown an apparatus for carrying out the method of this invention. Therein, Fig. 1 is a side elevation, partly in section, of the apparatus for feeding the paper web, showing also the means for moving the trays beneath the filling nozzle, a part of which is also shown; Fig. 2 is a plan view of the mechanism for forming the paper web in channel shape and directing it into the trays; Fig. 3 is a sectional view on the line 3—3 of Fig. 1, looking in the direction of the arrows; Fig. 4 is a sectional view on the line 4—4 of Fig. 1, looking in the direction of the arrows; Fig. 5 is a sectional view on the line 5—5 of Fig. 1, looking in the direction of the arrows; Fig. 6 is a front elevation, partly in section of the pumps, pipes and delivery spout for ice cream of three different flavors; Fig. 7 is a vertical sectional view through the structure of Fig. 6 looking at right angles thereto; Fig. 8 is a sectional view on the line 8—8 of Fig. 7, looking in the direction of the arrows; Fig. 9 is a sectional view on the line 9—9 of Fig. 7, looking in the direction of the arrows; Fig. 10 is a plan view, partly in section, of one end of the apparatus for filling the trays, showing the filled trays leaving the filling mechanism and entering the freezing chamber, a part of which is also shown; Fig. 11 is a plan view, with parts in section, of a part of the freezing chamber, showing the means located at the outlet thereof for folding the paper strip or wrapper about the hardened bar or slab of cream, and also showing the cutting device for severing the hardened and wrapped bars into the finished bricks or slices; Fig. 12 is a vertical sectional view through one of the walls of the freezing chamber, showing the wrapper folding means and the means for stripping the wrapped and hardened bar of ice cream from its tray; Fig. 13 is a front elevation of the nozzle or spout through which one or several flavors of ice cream are simultaneously extruded for delivery in the form of a continuous ribbon or strip into the paper-lined trays; Figs. 14 and 15 are vertical sectional views through the nozzle, at right angles to Fig. 13, showing how the outlet opening therein may be regulated in size by the introduction in the opening of plates of different thickness; Fig. 16 is a perspective view of one of the plates employed for closing the ends of the trays; Fig. 17 is a side view of the end portions of two of the trays in abutment, showing how the end plates are placed thereon; Fig. 18 is a plan view of two trays showing the end plates in position, and Fig. 19 is a side elevation of the structure of Fig. 18, with parts broken away and in section, illustrating how the end plates are fitted in position.

To afford simplicity of description, the material to be formed into bricks or slices is herein referred to as "ice cream", it being understood, however, that the method and apparatus may be employed in connection with the production of wrapped bricks of such other plastic materials and commodities as candy, soap, cheese and the like.

In carrying out the improved method, the ice cream or the like in a plastic or semi-liquid state, and preferably of several different flavors, is supplied from one or more hoppers and is fed under continuous pressure through a suitably shaped nozzle into paper-lined elongated troughs or trays in which the material, when it is ice cream, is carried into a freezing chamber and there hardened. Parts of three hoppers from which the cream is fed, are shown at 20, 21 and 22 in Fig. 6. The hopper 20 may supply ice cream of one flavor, as for example, vanilla, the hopper 21 may provide chocolate flavor, while that shown at 22 may provide strawberry so that the resultant strip or bar formed by these three flavors of cream and forced through the nozzle 23 will be multi-flavored. A pipe 24 leads from each of the hoppers and connects to a pump casing 25 within which a rotary pump is operated to continuously feed the ice cream toward the nozzle or spout 23. Each pump is provided with the conventional eccentrically mounted impeller 26 carrying radially mounted loose blades 27 held in contact with the inner surface of the valve casing by the rotative action of the impeller. The shaft 28 of each of the pumps is connected to that of the next pump by means of a coupling 29 so that the effect of a single shaft for the three pumps is attained, the coupled shafts being driven by the chain 30 engaging the sprocket 31 and driven by any suitable source of power. The sides of each of the valve casings are closed by plates 32 and 33, which are clamped against the opposite sides of the casing by means of the connecting bolts 34 upon which wing-nuts 35 are mounted. The pumps are supported upon a cross-piece 36 located at the upper end of standards 37 extending upwardly from a support 38 forming a part of the frame of the machine. For each of the valve casings, the cross-piece carries a vertically disposed plate 39, dovetail in cross-section, and formed with a threaded stud 40 which extends through the cross-piece 36 and receives a wing-nut 41. Secured to the valve casing 25 by screws 44 is a slotted plate 42, the slot 43 therein being of dovetail shape to fit the plate 39. By tightening the wing-nut 41 the dovetail plate 39 is drawn toward the cross-piece, the angular edges of the plate 39 acting against the angular sides of the slot 43 and serving to hold the plate 42 and the attached valve casing firmly against the cross-piece 36. The weight of the pump and casing is also supported by a pin 45 passing through the cross-piece 36 and projecting therefrom, said pin having a laterally extending stud 46 by which it may be shifted through the cross-piece when the pump casing is to be removed. By means of the assembly described, access to the interior of each of the pumps for cleaning or inspection is readily had. Any one of the pumps may also be readily replaced should the occasion arise. The ice cream may also be fed by gravity or by air pressure, in which event the use of pumps will be dispensed with.

At its lower end, each of the pump casings connects by means of the coupling nut 47, with a downwardly extending pipe 48, the lower ends of the three pipes 48 coming together and entering the upper end of the spout or nozzle 23. The spout or nozzle is curved as clearly shown in Fig. 7 so that the ice cream forced from its outlet opening 49 is delivered horizontally and substantially at right angles to the direction of feed of the cream through the pipes 24 and 48. The nozzle or spout is partitioned at 50 for the greater portion of its length into three passageways through which the ice cream of different flavors is forced. These three passageways enter into the single outlet opening 49 where the three flavors of ice cream merge and are forced from the nozzle in the form of a flat ribbon or strip. It has been found desirable to merge the plurality of flavors in the single opening 49 before they leave the nozzle to cause them to coalesce into a single multi-flavored ribbon which will not afterwards separate into its component parts. The ribbon of ice cream emanating from the nozzle is thus equally divided into three flavors. The thickness of the ribbon or strip of cream forced from the nozzle is regulated by the insertion in the outlet opening 49 of plates of different thickness to partly close the opening. For example, in Figs. 13 and 14 a relatively thin plate 51 is secured by the bolts 52 in the outlet opening, thus reducing the size of the outlet and consequently reducing the thickness of the ribbon of cream forced from said opening. In Fig. 15 a thicker plate 53 has been placed in the opening, resulting in the extrusion of a correspondingly thinner ribbon or strip of cream.

The strip of ice cream forced from the nozzle or spout 23 is received in a channel-shaped paper strip 54 supported in and forming a lining for a channel-shaped trough or tray 55 while the tray and lining-strip travel horizontally on an endless belt or conveyor 56. The belt 56 extends about pulleys 57 and 58, the lower stretch of the belt passing over idle rolls 59 while the upper stretch moves between guiding flanges 61 and extends over a number of idle rolls 60 rotatably mounted between the flanges 61 of the table 62. A chain 63 extending from any suitable driving means, engages and drives a sprocket 64 secured on the shaft 65 on which the pulley 58 is secured so that the belt 56 is continuously driven. The speed of the belt, the size of the nozzle opening 49 and the speed at which the plastic or semi-liquid cream is fed through the nozzle 23 are so correlated that a ribbon or strip of cream of the desired thickness is uniformly deposited flatwise in the channel-shaped paper strip located in and moving with the channel-shaped trough 55.

Each of the troughs or trays is in the form of an elongated open-ended channel member, preferably from ten to twelve feet in length. The trays are fed from the left of Fig. 1 and are frictionally held in contact with the upper surface of the conveyor belt 56 by the pressure of rolls 66 which fit down in and rest against the bottom of each tray as shown in Fig. 4. The shafts 67 of the rolls 66 are loosely mounted in enlarged openings 68 provided in vertical lugs 69 secured to and projecting upwardly from the flanges 61 on the table. Other means for moving the trays might be employed, as for example, a rack provided on the bottom of each tray engaged and driven by one or more pinions. As the trays are successively moved in end to end contact along on the conveyor belt 46 toward the right of Fig. 1, the paper strip 54 is inserted.

This paper strip is fed from a roll 70 mounted on a spindle 71 supported in brackets 73 secured to the crosspiece 36 of the frame. Paper is drawn downwardly from the roll and extends about a tension roll 74 rotatable in lugs 75 projecting upwardly from the table 62. From beneath the roll 74 the paper extends under a spring tongue 76 having one of its ends secured to a bracket 77 which straddles the conveyor belt 56. The downwardly directed free end of the tongue 76 is formed with a rounded contacting surface 78 (Fig. 3) which bears upon the paper strip and causes it to be directed slightly downwardly toward the inside of the tray 55 carried beneath it. Secured beneath the bracket 77 is a smoothly rounded block 79 which also bears downwardly on the paper strip, forcing it within the tray 55 as clearly shown in Fig. 5. The paper strip next passes under a roller 80 rotatably mounted in brackets 81, the pressure of this roller completing the operation of forming the paper strip into channel-shape and causing it to closely fit the interior of the trough, lining the same with paper. The roller 80 also frictionally holds the paper strip in contact with the bottom of the tray so that the tray moves the strip along with it as it is transported by the conveyor belt 56. The strip of paper drawn from the roll 70 is of such width that when it is folded in channel-shape to form a lining for the trays, its longitudinal edge portions 82 and 83 project for a distance above the upper longitudinal edges of the tray, these edge portions forming flaps which are later folded down about the ice cream after the freezing of the cream in the tray has occurred.

The channel-shaped paper strip thus supported in a tray moving beneath the nozzle or spout 23 receives ice cream therefrom, the ribbon of cream being received flatwise in the paper strip. Since the plane of the nozzle opening 49 is at right angles to the direction of movement of the paperlined tray on the conveyor belt, the flow of ice cream from the nozzle is directed horizontally or parallel to the surface on which it is deposited, resulting in an even and smooth distribution of the ice cream within the channel-shaped paper strip in the tray. As each tray becomes filled and is removed from the discharge end of the conveyor, at the right end of Fig. 1, an empty tray is inserted at the intake or left end of Fig. 1 so that the ends of the several trays carried by the conveyor are in abutment and one of the trays carrying a paper lining is always passing beneath the filling nozzle, providing for continuous filling operation.

When a tray is filled, the operator severs the wrapper at the point where that tray and the next tray meet, as indicated at 84 in Figs. 17 and 19 and then closes the ends of the filled tray to prevent the plastic or semi-liquid cream from running out. Closing of the ends of the tray is effected by means of plates 85 which have their side edges laterally and then inwardly bent to form angular flange portions 86 which fit over lugs 87 provided on the sides of the tray. In Figs. 17 to 19 the manner in which the adjacent ends of two filled trays are closed by the placement of two plates 85 thereon, is clearly shown.

If the material placed in the trays is ice cream or some other substance requiring a low temperature to harden it, the filled trays with their ends closed by the plates 85 next enter a refrigerating chamber, a part of which is indicated at 87 in Figs. 10 to 12 inclusive. The refrigerating chamber is of very low temperature and rapidly hardens the contents of the trays, so that the trays need remain therein for only a relatively short time and when passed out of the refrigerating chamber through the egress opening 88 provided in the wall 89 thereof, the ice cream in each of the trays is in the form of a hardened elongated slab. While the trays are in the refrigerating chamber, the paper tray lining 54 is preferably retained in channel-shape so that the upper surface of the ice cream in the trays is directly exposed to the frigid atmosphere and the hardening of the ice cream is facilitated. In passing in and out of the refrigerating chamber, the filled trays are moved on rollers 90, and when the trays reach the outlet opening 88 in the refrigerating chamber, the upstanding edge portions 82 and 83 of the paper web are folded down about the slab of ice cream as shown in Fig. 11. This folding operation may be done either manually as the hardened ice cream issues from the refrigerating chamber, or it may be performed automatically by the curved plates 91 and 92 located within the refrigerating chamber adjacent the outlet opening therein. In either case each tray as it issues from the refrigerating chamber contains a hardened strip or slab of ice cream contained in and protected by a paper wrapper 54. As the paper wrapper fully protects the slab, it may be freely handled without the hands of the operator being brought into direct contact with the ice cream.

When one end of a tray issues from the refrigerating chamber, the plate 85 is removed, and the end of the wrapped and hardened slab of cream first issuing from the refrigerating chamber and indicated at 93 in Figs. 11 and 12, is manually raised out of the tray and placed on the surface of a table 94. At the same time the tray is received upon a lower support 95. As the tray and slab of cream are both moved in the direction of the arrows (Figs. 11 and 12) the slab 93 is stripped from the tray and is brought to rest on the table 94. When a number of these wrapped and hardened slabs reach the table they are turned up on edge and placed together with their wider faces in contact, on a conveyor belt 96 which carries them to cutting mechanism.

The cutting mechanism, which is mounted on the table 97 may be of any suitable kind. It is shown in the form of a rotary knife 98 which is moved toward and away from the slabs 93. That is to say, when a section of the contiguously placed slabs has been moved to locate it in position to be cut, the knife is moved toward the slabs and severs the section from each and then moves away to permit the next section of the slabs to be fed in readiness for the next cut, when the knife again moves toward the slabs and severs it. In Fig. 11 a section 99 is shown as being cut from the slabs, while a severed section 99a, composed of eight flat bricks of ice cream, is being carried away on the conveyor 100.

The mechanism for feeding the slabs of ice cream to the knife, comprises the plates 101 and 102 which engage the slabs of ice cream and move them forwardly together for a predetermined distance, when they are gripped between the gripper plates 103 and 104 and held while a section is cut from them. The gripper plates then release their hold on the slabs and the plates 101 and 102 are moved rearwardly, or to the right of Fig. 11, in their respective slots 105 and 106 and then engage the slabs and move them toward the knife for the cutting of the next section.

To summarize, the method employed in the manufacture of the bricks, is as follows:—

One or more flavors of ice cream or other material are fed continuously to the nozzle 23 where they merge in the outlet opening 49 and are fed therefrom in a continuous ribbon flatwise into the channel-shaped paper strip supported in the trays carried on the conveyor belt 56 beneath the nozzle. As each paper-lined tray is filled with the ice cream or other material, the paper strip is severed between the filled tray and that next to it, and the end plates 85 are fitted in position on the opposite ends of the filled tray to close it. The filled tray is then delivered to the refrigerating chamber or subjected to such other step in the process as the particular material requires to harden or solidify it. The refrigerating chamber or other apparatus may, for convenience, be positioned at the end of the filling mechanism so that the trays may be delivered directly into it. If desired, however, the refrigerating chamber or other apparatus may be located wherever convenient, and the filled trays transported thereto either manually or by conveyor means. While the filled trays are in the refrigerating chamber the upper surface of the ice cream contained in the trays is exposed to the chilled air within the chamber, since the upstanding edge portions of the channel-shaped wrapper in the trays are maintained erect until the ice cream is hardened and the trays leave the chamber. Then the folding operation of the longitudinal edge portions of the wrapper takes place so that the slab of hardened ice cream leaving the chamber is in wrapped form. When it leaves the chamber it is removed from the tray and is slid across the surface of the table 94 while the empty tray is received upon the lower table or support 95. When one or more slabs 93 reach the table 95 they are stood on edge and placed contiguously together on top of the conveyor 96 which carries them to the feeding mechanism which progressively feeds them to the rotary cutter 98, which severs the slabs into the slices 99 that are received upon the conveyor 100 and carried away to be packed in cartons.

The number of slabs placed together for cutting is dependent upon the carton size into which each cut group of slices is to be packed. For example, in Fig. 11 eight slabs are placed together which results in the cutting of eight slices, filling a quart carton. Similarly, pint cartons are filled by cutting four slices at once. When thinner or thicker slabs are used the amount of slabs placed together for cutting is increased or decreased accordingly.

The entire method of manufacture is one in which utmost sanitation is employed, the ice cream or other material being at no time directly touched by human hands before it is enclosed in the paper wrapper. Through the method employed the bricks or slices are speedily and accurately cut and each brick or slice is in wrapped condition ready for packing.

What I claim is:—

1. The method of forming bricks of ice cream or the like, consisting in feeding plastic material into a channel-shaped paper strip, supporting the strip in a moving channel-shaped tray upon a conveyer, freezing the material while it is held in the strip and while the strip is supported by the tray, folding edge portions of the strip about the frozen material, removing the strip and frozen material from the tray and cutting the wrapped and frozen material into slices.

2. The method of forming bricks of ice cream or other like material, consisting in feeding the material while in soft condition into an elongated channelled tray placed upon a moving conveyor and containing a paper lining, treating the material while contained in the paper lined tray to harden it and form it into a relatively stiff strip or bar, enclosing the strip or bar within the paper lining, removing the wrapped strip or bar from the tray and cutting it into slices.

3. The method of forming bricks of ice cream or other like material consisting in placing an elongated paper-lined tray on a moving conveyor and filling the paper lined tray with the ice cream or other material in plastic condition, freezing the ice cream or other material while in the tray, wrapping the paper tray-lining about the frozen ice cream or other material, removing the wrapped ice cream or other material from the tray and cutting it into slices.

4. The method of forming ice cream bricks consisting in moving an elongated channel-shaped tray on a conveyor, inserting a paper strip into the tray and moving the strip in channel-shaped form along with the tray, filling the paper strip with plastic ice cream, closing the ends of the tray, freezing the ice cream while it is in the paper strip in the tray, wrapping the paper strip about the frozen ice cream, removing the frozen and wrapped ice cream from the tray and cutting it into bricks.

5. The method of forming ice cream bricks consisting in moving a long, channel-shaped tray on a conveyor, inserting a paper strip into the tray and moving the paper and tray together beneath a filling spout, filling the paper with multi-flavored ice cream from the spout, closing the ends of the tray, freezing the ice cream while it is in the tray and while the upper face of the cream is exposed, covering the upper surface of the frozen ice cream by folding edge portions of the paper strip over it, removing the paper-covered frozen ice cream from the tray and cutting it into bricks.

6. The method of forming ice cream bricks consisting in conveying successive elongated channel-shaped trays beneath a filling spout, inserting a continuous channel-shaped paper lining into the trays, filling the lining with ice cream from the spout, closing the ends of each of the trays, severing the paper strip between the trays, freezing the ice cream in the trays, folding edge portions of the paper lining about the frozen ice cream, removing the frozen paper-wrapped ice cream from the trays, placing several wrapped sections of ice cream together on edge, and cutting slices from the several ice cream sections.

7. The method of forming ice cream bricks consisting in continuously feeding several flavors of ice cream through a number of pipes leading to a single nozzle, ejecting the ice cream in plastic ribbon form through the nozzle and in the direction of movement of a conveyor operating beneath the nozzle, moving paper-lined, channel shaped trays on the conveyor successively beneath the nozzle to receive ice cream therefrom, placing end plates on the ends of each filled tray, freezing the ice cream in the trays, folding the paper linings of the trays to cause them to enclose the frozen ice cream, removing the wrapped cream from the trays, placing the wrapped cream edgewise on a support and feeding it to cutting means to cause it to be cut into bricks.

8. The method of forming ice cream bricks consisting in continuously feeding several flavors of ice cream through pipes leading to a single nozzle, ejecting the ice cream flatwise in plastic ribbon form from the nozzle and in the direction of movement of a conveyor operating beneath the nozzle, moving channel-shaped trays on the conveyor successively beneath the nozzle, feeding a U-shaped paper lining into the trays, placing end plates on the ends of each tray after the same has been filled with ice cream, freezing the ice cream in the trays, folding the paper linings of the trays over the frozen ice cream to cause them to enclose the ice cream, removing the wrapped ice cream from the trays, placing a number of sections of ice cream edgewise on a support and feeding them to cutting means to cut the sections of ice cream simultaneously into bricks.

9. The method of forming ice cream bricks consisting in moving a number of open-ended elongated channel-shaped trays in end to end relationship along on a conveyor, forming a continuous flat paper sheet into U-shape and directing it into the trays to provide a lining therefor, filling the paper-lined trays by a flow of plastic ice cream directed in the direction of movement of the trays, closing the ends of each tray, severing the paper sheet between adjacent trays, freezing the ice cream in the trays while the paper sheet in each tray is in U-shape, folding down longitudinal edges of the paper sheets to cause each of the sheets to enclose a frozen slab of ice cream, removing the frozen and wrapped ice cream slabs from the trays, placing a number of the wrapped slabs together on edge and cutting them into bricks.

10. In an apparatus for forming ice cream bricks, a conveyor, elongated open-ended channelled trays carried in end to end relation on said conveyor to form a relatively continuous, moving channelled support, means for folding a continuous paper strip to cause it to conform to the shape of the trays and inserting the strip within the trays, a nozzle projecting within one of the trays and having an outlet opening headed in the direction of movement of the conveyor, and means for continuously forcing ice cream through the nozzle to fill the paper strip while the strip is located within the trays.

11. In an apparatus for forming ice cream bricks, a conveyor, an elongated channelled tray carried on said conveyor, means for forming a paper strip into channel-shape and forcing it into the tray, a nozzle projecting into the tray, means for forcing several flavors of ice cream through the nozzle and into the tray while the tray is in movement on the conveyor, means for closing the ends of the tray, means on the tray for receiving said closure means, means for freezing the ice cream in the tray, means for folding the paper strip about the frozen cream to enclose the same, and means for cutting the frozen and wrapped ice cream into bricks.

12. In an apparatus for forming ice cream bricks, a conveyor, an elongated channel-shaped tray adapted to be carried thereon, rollers resting within said tray and holding it frictionally against the conveyor, a paper roll, means for directing paper fed from the roll into the tray, a roller resting in rotative contact against the tray for forming the paper into channel-shape and holding it in contact with the bottom of the tray so that the paper is moved along therewith, and a filling nozzle having its end headed in the direction of movement of the tray and paper, for filling the paper with plastic ice cream.

13. In an apparatus for forming ice cream bricks, a conveyor, a number of elongated open-ended channel-shaped trays carried in end to end relationship on the conveyor, a paper roll, means for forming a continuous paper strip drawn from said roll into a channel-shape and forcing it within the trays, means for filling the strip with plastic ice cream while said strip is located in the trays, and means for closing the ends of each tray after it has been filled.

14. In an apparatus for forming ice cream bricks, means for moving a channel-shaped paper strip, a nozzle for filling the strip having a curved end extended in the direction of movement of the strip, partitions within the nozzle dividing it into separate passages, an outlet passage adjacent the nozzle opening into which the several passages merge and means for increasing or reducing the size of the outlet passage.

15. In an apparatus for making bricks of ice cream or the like, a plurality of sources of plastic ice cream, means for putting the ice cream under pressure, a nozzle having a single opening of the desired cross sectional area of the ultimate product, and separate conduits leading from the single opening in the nozzle to each of the separate sources of the cream.

16. The method of forming bricks of ice cream or the like, consisting in assembling a channel-shaped tray and a channel-shaped paper strip supported therein upon a conveyor while moving in the same general direction, feeding plastic material into the channel-shaped strip to be thereafter wrapped therein, freezing the material while the strip and tray are assembled, removing the strip and frozen material from the tray and cutting the wrapped frozen material into slices.

LESLIE A. MAPES.